(12) United States Patent
Misumi et al.

(10) Patent No.: US 10,024,438 B2
(45) Date of Patent: Jul. 17, 2018

(54) DOUBLE ECCENTRIC VALVE

(71) Applicant: AISAN KOGYO KABUSHIKI KAISHA, Obu-shi, Aichi-ken (JP)

(72) Inventors: Hiroshi Misumi, Nagoya (JP); Sunao Kitamura, Nagoya (JP)

(73) Assignee: AISAN KOGYO KABUSHIKI KAISHA, Obu-Shi (JP)

( * ) Notice: Subject to any disclaimer, the term of this patent is extended or adjusted under 35 U.S.C. 154(b) by 0 days.

(21) Appl. No.: 15/301,777

(22) PCT Filed: Jun. 24, 2015

(86) PCT No.: PCT/JP2015/068197
§ 371 (c)(1),
(2) Date: Oct. 4, 2016

(87) PCT Pub. No.: WO2016/002599
PCT Pub. Date: Jan. 7, 2016

(65) Prior Publication Data
US 2017/0152953 A1 Jun. 1, 2017

(30) Foreign Application Priority Data

Jun. 30, 2014 (JP) .................................. 2014-134268

(51) Int. Cl.
*F16K 1/24* (2006.01)
*F16K 1/20* (2006.01)
(Continued)

(52) U.S. Cl.
CPC ............ *F16K 1/221* (2013.01); *F16K 31/041* (2013.01)

(58) Field of Classification Search
CPC ..... F16K 1/18; F16K 1/20; F16K 1/24; F16K 1/2007; F16K 1/2028; F16K 1/2035;
(Continued)

(56) References Cited

U.S. PATENT DOCUMENTS 1,504,288 A * 8/1924 Vencl ........................ F16K 1/24
251/158
3,776,505 A * 12/1973 Nakanishi ................. F16K 1/24
251/163
(Continued)

FOREIGN PATENT DOCUMENTS

| DE | 4113019 A1 * | 10/1992 | ............... F16K 1/24 |
|---|---|---|---|
| EP | 1420158 A2 | 5/2004 | |
| EP | 2218895 A1 | 8/2010 | |
| JP | H08303308 A | 11/1996 | |

(Continued)

OTHER PUBLICATIONS

Jan. 3, 2017 International Preliminary Report on Patentability issued in International Patent Application No. PCT/JP2015/068197.

*Primary Examiner* — Seth W Mackay-Smith
(74) *Attorney, Agent, or Firm* — Oliff PLC

(57) ABSTRACT

A double eccentric valve includes: a drive mechanism which produces drive force for rotating a rotary shaft in a direction to open the valve; a drive force receiving unit provided integrally with the rotary shaft to receive the drive force; a bearing located between a valve element and the drive force receiving unit along the center axis of the rotary shaft to support the rotary shaft; and a return spring which produces return spring force for rotating the rotary shaft in a valve closing direction. The double eccentric valve is configured to generate a separating-direction biasing force which inclines the rotary shaft with the bearing at a fulcrum to bias the valve assembly away from a valve seat, the force being caused by the return spring force when the drive mechanism is not operated and acting in a direction perpendicular to the center axis of the bearing.

6 Claims, 19 Drawing Sheets

(51) Int. Cl.
*F16K 1/22* (2006.01)
*F16K 31/04* (2006.01)

(58) Field of Classification Search
CPC ...... F02M 26/54; F02M 26/70; F02D 9/1025;
F02D 9/1065
USPC .................................................. 251/129.12
See application file for complete search history.

(56) References Cited

U.S. PATENT DOCUMENTS

| | | | |
|---|---|---|---|
| 3,809,361 A * | 5/1974 | Pfundstein | F16K 1/226 251/305 |
| 4,203,573 A | 5/1980 | Boss | |
| 6,494,434 B1 * | 12/2002 | Geiser | F16K 1/24 251/229 |
| 2004/0177839 A1 | 9/2004 | Veinotte | |
| 2014/0075933 A1 * | 3/2014 | Jaegle | F02B 37/186 60/602 |
| 2016/0290513 A1 | 10/2016 | Asanuma et al. | |
| 2016/0290514 A1 | 10/2016 | Misumi et al. | |

FOREIGN PATENT DOCUMENTS

| | | |
|---|---|---|
| JP | 2001-214816 A | 8/2001 |
| JP | 2002349299 A | 12/2002 |
| JP | 2004-162665 A | 6/2004 |
| JP | 2008075517 A | 4/2008 |
| JP | 2009243336 A | 10/2009 |
| JP | 2011-047290 A | 3/2011 |
| JP | 2012-072793 A | 4/2012 |
| WO | 2015098952 A1 | 7/2015 |
| WO | 2015098954 A1 | 7/2015 |

\* cited by examiner

DOUBLE ECCENTRIC VALVE

CROSS-REFERENCE TO RELATED APPLICATIONS

This is a US national phase application based on the PCT International Patent Application No. PCT/JP2015/068197 filed on Jun. 24, 2015, and claiming the priority of Japanese Patent Applications No. 2014-134268 filed on Jun. 30, 2014, the entire contents of which are herewith incorporated by reference.

TECHNICAL FIELD

The present invention relates to a double eccentric or offset valve in which a valve element is placed with a rotation center (a rotary shaft) positioned eccentrically from a center of a valve hole of a valve seat and a sealing surface of the valve element is positioned eccentrically from the rotary shaft.

BACKGROUND ART

Patent Document 1 discloses an exhaust gas recirculation apparatus configured to open a valve element of a butterfly valve from a fully-closed position and stop at a predetermined opening degree, thereby preventing sticking between a valve seat and a valve element due to deposits during non-energization of a rotary solenoid.

RELATED ART DOCUMENTS

Patent Documents

Patent Document 1: JP-A-2001-214816

SUMMARY OF INVENTION

Problems to be Solved by the Invention

However, in the technique disclosed in Patent Document 1, the butterfly valve stops at some midpoint within a rotatable range of the butterfly valve. Thus, when a gap between the valve seat and the valve element is set small in order to reduce a leakage amount, for example, the valve seat and the valve element may bite each other. Thus, sticking between the valve element and the valve seat could not be prevented reliably.

The present invention has been made in view of the circumstances to solve the above problems and has a purpose to provide a double eccentric valve capable of reliably preventing sticking between a valve seat and a valve element.

Means of Solving the Problems

To achieve the above purpose, one aspect of the invention provides a double eccentric valve comprising: a valve seat including a valve hole and a seat surface formed at an edge of the valve hole; a valve element formed with a sealing surface on an outer periphery corresponding to the seat surface; a rotary shaft integrally provided with the valve element to rotate the valve element, the rotary shaft having a central axis extending in parallel to a radial direction of the valve element and the valve hole, the central axis of the rotary shaft being positioned eccentrically from a center of the valve hole in another radial direction of the valve hole, and the sealing surface being positioned eccentrically from the central axis of the rotary shaft toward an extending direction of a central axis of the valve element, wherein the double eccentric valve further comprises: a drive mechanism configured to generate a drive force to rotate the rotary shaft in a valve opening direction; a drive force receiving part integrally provided with the rotary shaft and configured to receive the drive force; a bearing placed in a position between the valve element and the drive force receiving part in a direction of the central axis of the rotary shaft to support the rotary shaft; and a return spring configured to generate a return spring force to rotate the rotary shaft in a valve closing direction, and wherein, during non-operation of the drive mechanism, the double eccentric valve generates a separating-direction urging force to cause the rotary shaft to incline about the bearing serving as a fulcrum and urge the valve element in a direction away from the valve seat, the separating-direction urging force being a force caused by the return spring force and acting in a direction perpendicular to a central axis of the bearing.

According to the above aspect, when the double eccentric valve is in a valve-closed state during engine stop and non-operation of a drive mechanism, a slight gap is generated between the valve seat and the valve element. Therefore, even when deposits adhere to the valve seat or the valve element, the valve seat and the valve element can be prevented from sticking to each other. Further, the valve seat and the valve element can also be prevented from sticking to each other due to freezing. Accordingly, the double eccentric valve can perform stable opening and closing operations. Further, the valve element is moved in a direction away from the valve seat by the separating-direction urging force. Even if foreign matters are caught between the valve seat and the valve element during valve closing operation, the foreign matters do not drop off and thus do not cause biting between the valve seat and the valve element. This can reliably prevent the valve seat and the valve element from sticking to each other.

In the above aspect, preferably, during operation of the drive mechanism, the double eccentric valve generates a seating-direction urging force to cause the rotary shaft to incline the rotary shaft about the bearing serving as the fulcrum and urge the valve element in a direction toward the valve seat, the seating-direction urging force being a force caused by the drive force and acting in a direction perpendicular to the central axis of the bearing.

According to the above aspect, the open area (the gap between the valve seat and the valve element) at an initial stage of a valve opening operation can be set small. Thus, a low flow rate can be achieved by the valve element at a small opening degree. This can enhance the accuracy of flow control while the valve element is at the small opening degree.

In the above aspect, preferably, the valve element is caused to seat on the valve seat by the seating-direction urging force.

According to the above aspect, the open area at the initial stage of the valve opening operation can be set smaller than the above case. Thus, a lower flow rate can be achieved by the valve element at the small opening degree. This can enhance the accuracy of flow control while the valve element is at the small opening degree.

In the above aspect, preferably, the double eccentric valve is configured to control an opening degree of the valve element relative to a reference position determined by an opening degree of the valve element positioned to allow fluid to flow at a predetermined flow rate.

According to the above aspect, variation in the flow rate in the reference position of the flow control is reduced, so that the accuracy of flow rate with respect to the opening degree of the valve element can be enhanced.

In the above aspect, preferably, the double eccentric valve is configured to control an opening degree of the valve element relative to a reference position determined by an opening degree of the valve element positioned in a valve closed state.

According to the above aspect, the reference position of the flow control is uniquely determined, so that the accuracy of flow rate with respect to the opening degree of the valve element can be enhanced.

The above aspect, preferably, further comprises a drive transmission part placed between the drive mechanism and the drive force receiving part and configured to transmit the drive force from the drive mechanism to the drive force receiving part.

According to the above aspect, the drive transmission part can increase and transmit the drive force received from the drive mechanism. Thus, the drive force to be generated by the drive mechanism can be set small. This can reduce the size of the drive mechanism.

Effects of the Invention

According to the double eccentric valve configured as above, it is possible to reliably prevent the valve seat and the valve element from sticking to each other.

MODE FOR CARRYING OUT THE INVENTION

Figure 1:
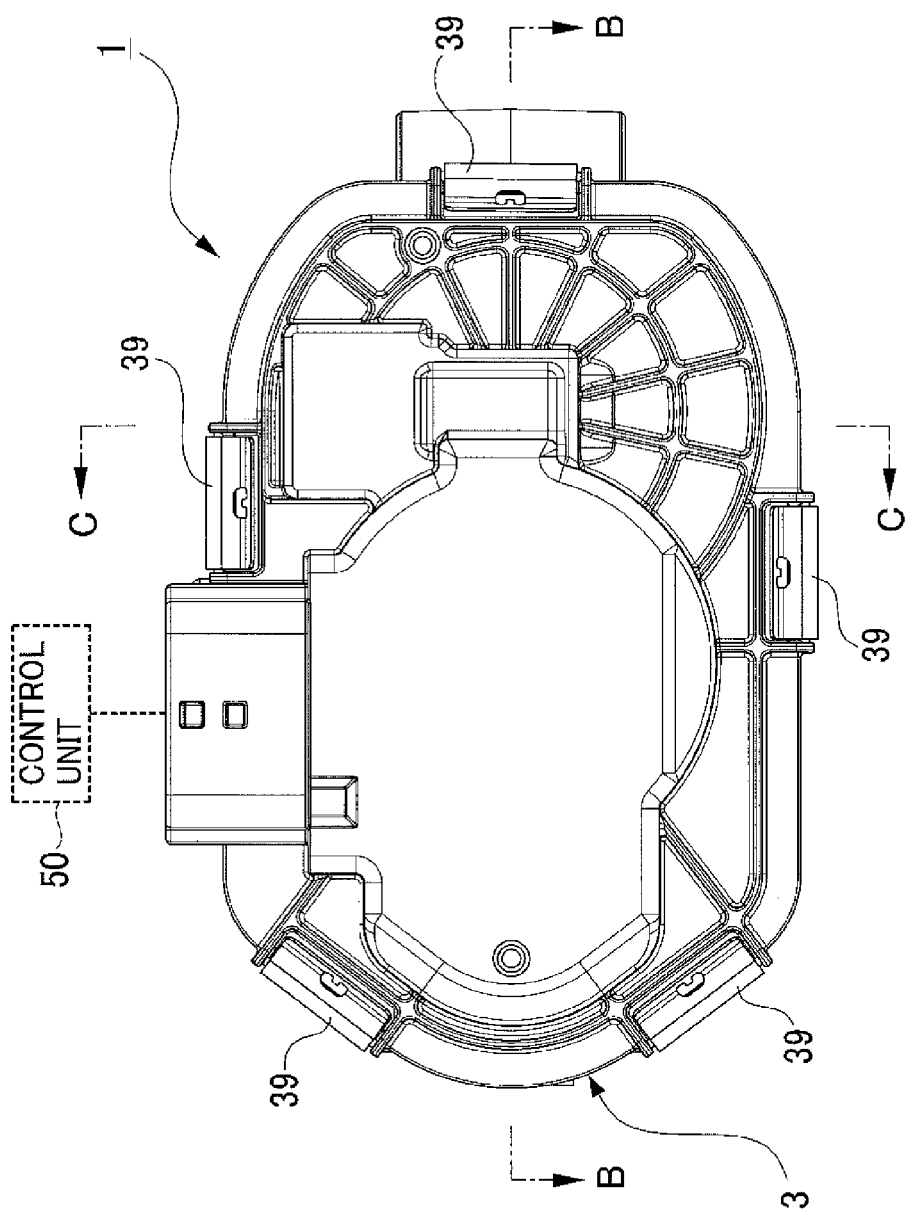
FIG. 1 is a front view of an electrically-operated EGR valve provided with a double eccentric valve.
Figure 2:
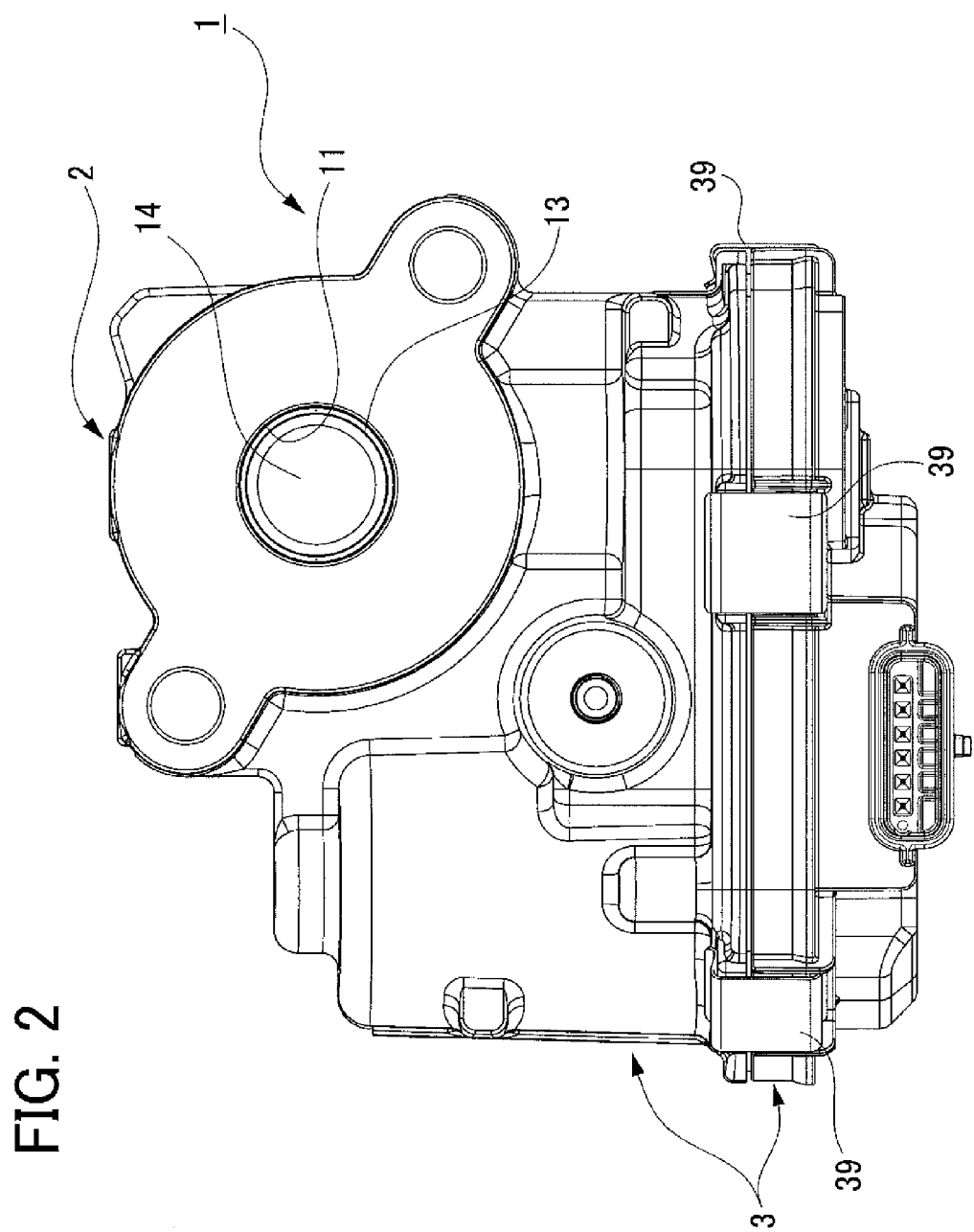
FIG. 2 is a top view of the electrically-operated EGR valve provided with the double eccentric valve.

As shown in FIGS. 1 and 2, a EGR valve 1 includes a valve unit 2, constituted of a double eccentric valve, and a drive mechanism unit 3. The valve unit 2 includes a pipe part 12 (see FIG. 7) formed with a flow passage 11 allowing EGR gas as a fluid to flow therethrough. In this flow passage 11, a valve seat 13, a valve element 14, and a rotary shaft 15 (see FIGS. 7 and 8) are arranged. The rotary shaft 15 receives drive force (torque) from the drive mechanism unit 3. This drive mechanism unit 3 is provided with a motor 32 and a speed reducing mechanism 33 (see FIGS. 7 and 8).

Figure 3:
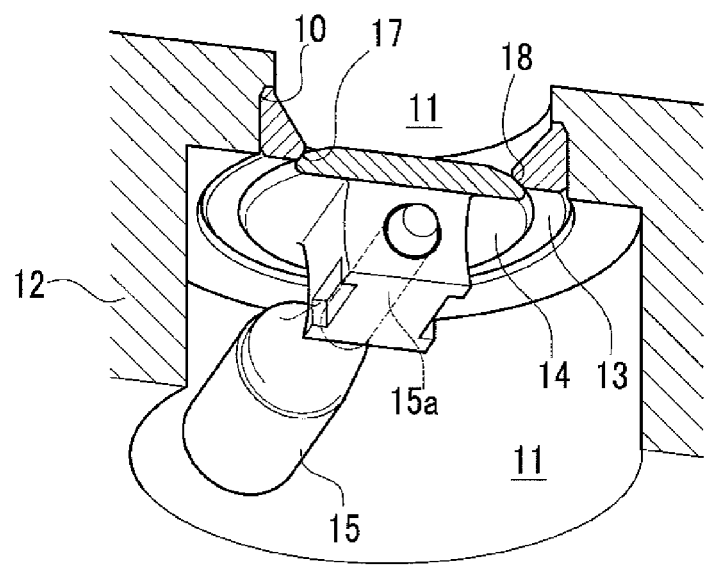
FIG. 3 is a partially-cutaway perspective view of a valve unit in a fully-closed state where a valve element is seated on a valve seat.
Figure 4:
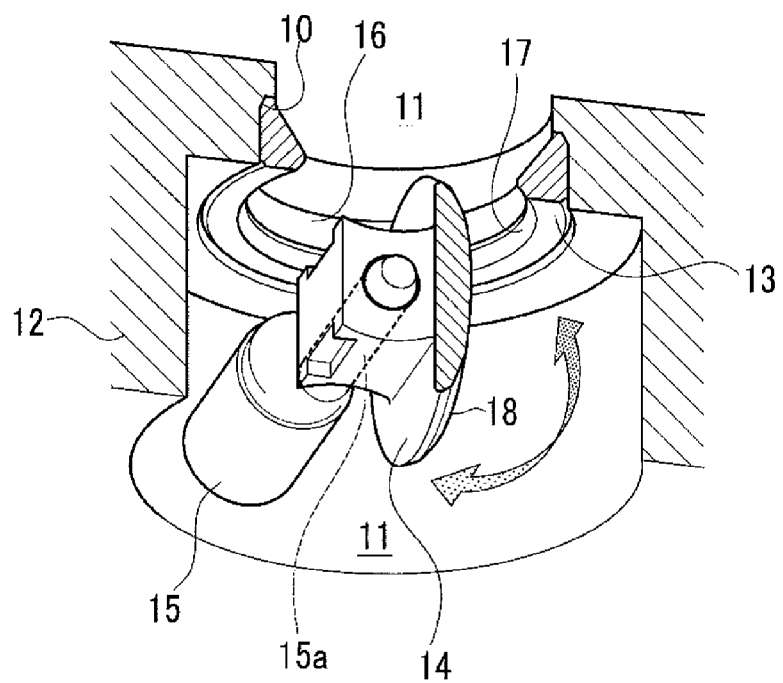
FIG. 4 is a partially-cutaway perspective view of the valve unit in a fully-open state where the valve element is separated furthest from the valve seat.

As shown in FIGS. 3 and 4, the flow passage 11 is formed with a stepped portion 10 in which the valve seat 13 is fixed by press fit. The valve seat 13 has an annular shape formed with a valve hole 16 in the center. On an edge of the valve hole 16, an annular seat surface 17 is formed. The valve element 14 has a circular disc shape with an annular sealing surface 18 on an outer periphery corresponding to the seat surface 17. The valve element 14 is fixed to the rotary shaft 15 and movable integrally with the rotary shaft 15. In FIGS. 3 and 4, the flow passage 11 below the valve element 14 represents an upstream side in the flow of EGR gas, while the flow passage 11 above the valve seat 13 represents a downstream side in the flow of EGR gas. In the flow passage 11, specifically, the valve element 14 is fixed on a more upstream side in a flow direction of EGR gas than the valve seat 13.

Figure 5:
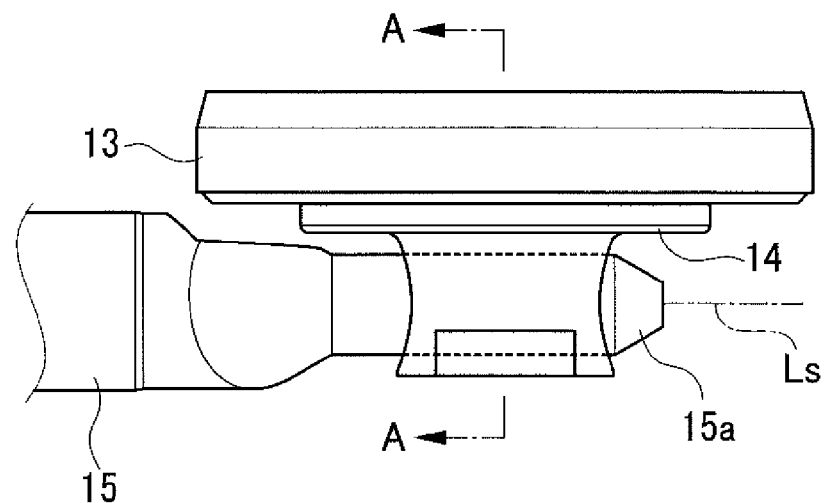
FIG. 5 is a side view of the valve seat, the valve element, and a rotary shaft in the fully-closed state.
Figure 6:
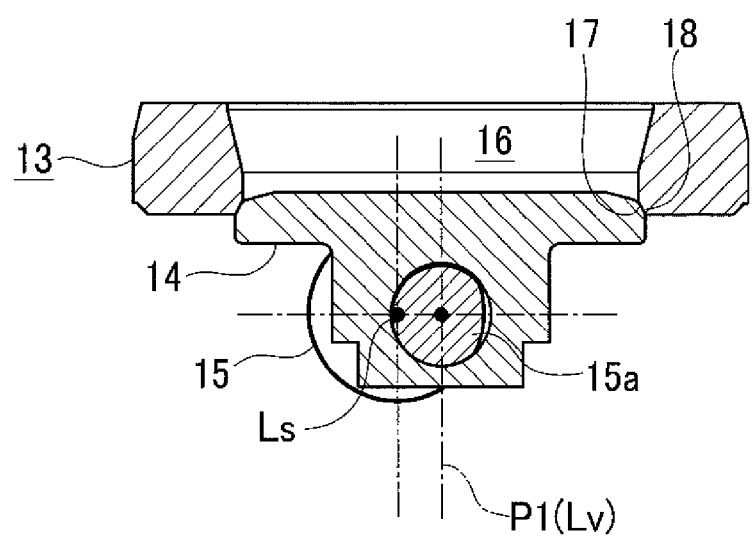
FIG. 6 is a cross-sectional view taken along a line A-A in FIG. 5.

As shown in FIGS. 5 and 6, the central axis Ls of the rotary shaft 15 extends in parallel to a radial direction of the valve element 14 and the valve hole 16 and is placed eccentrically, or offset, from the center P1 of the valve hole 16 in another radial direction of the valve hole 16. The sealing surface 18 of the valve element 14 is placed eccentrically toward an extending direction of the central axis Lv of the valve element 14 from the central axis Ls of the rotary shaft 15. The valve element 14 is configured to rotate about the central axis Ls of the rotary shaft 15 between a fully closed position in which the sealing surface 18 of the valve element 14 is in surface contact with the seat surface 17 of the valve seat 13 (see FIG. 3) and a fully open position (see FIG. 4) in which the sealing surface 18 is furthest away from the seat surface 17.

Figure 7:
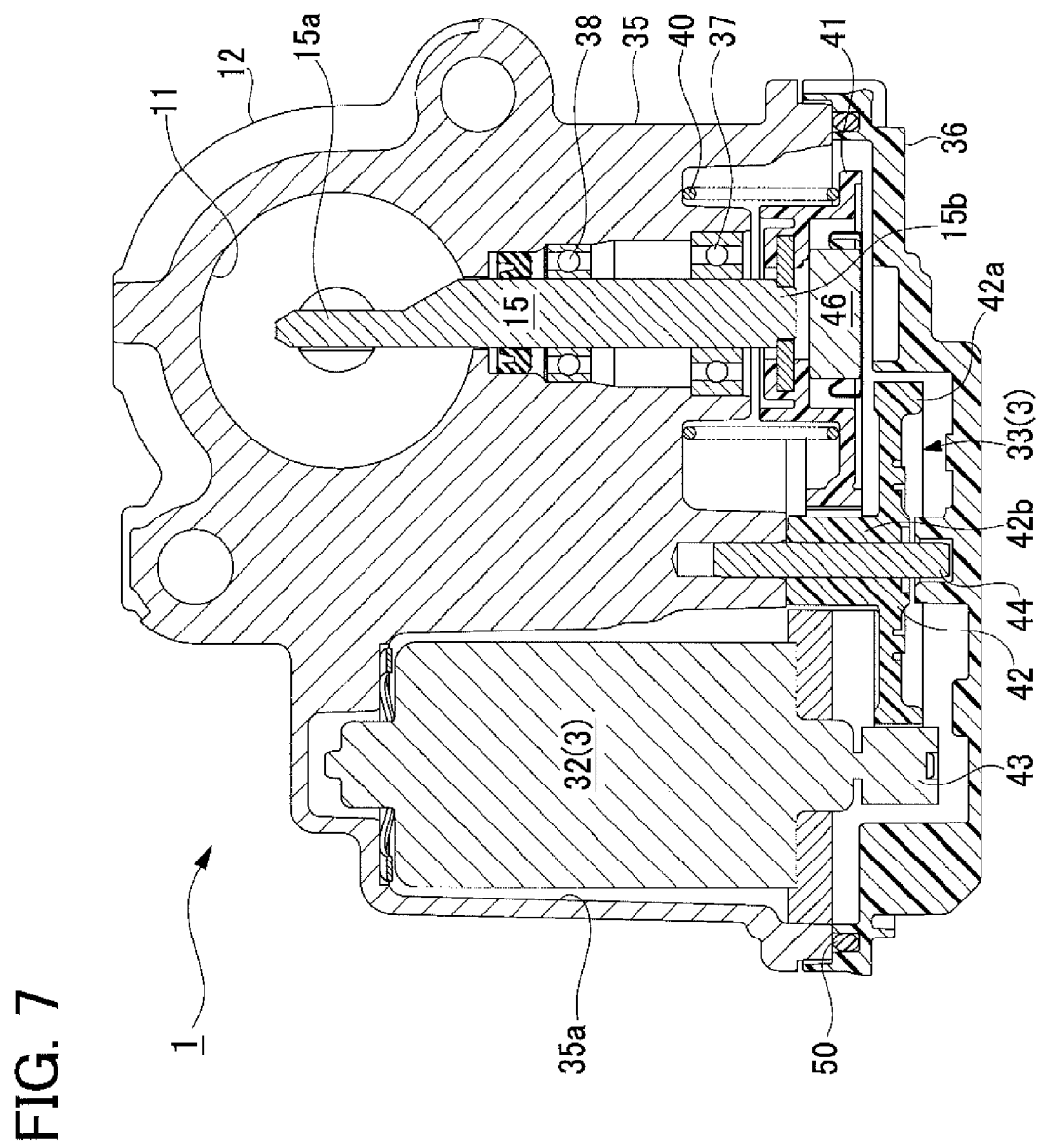
FIG. 7 is a cross-sectional view taken along a line B-B in FIG. 1.
Figure 8:
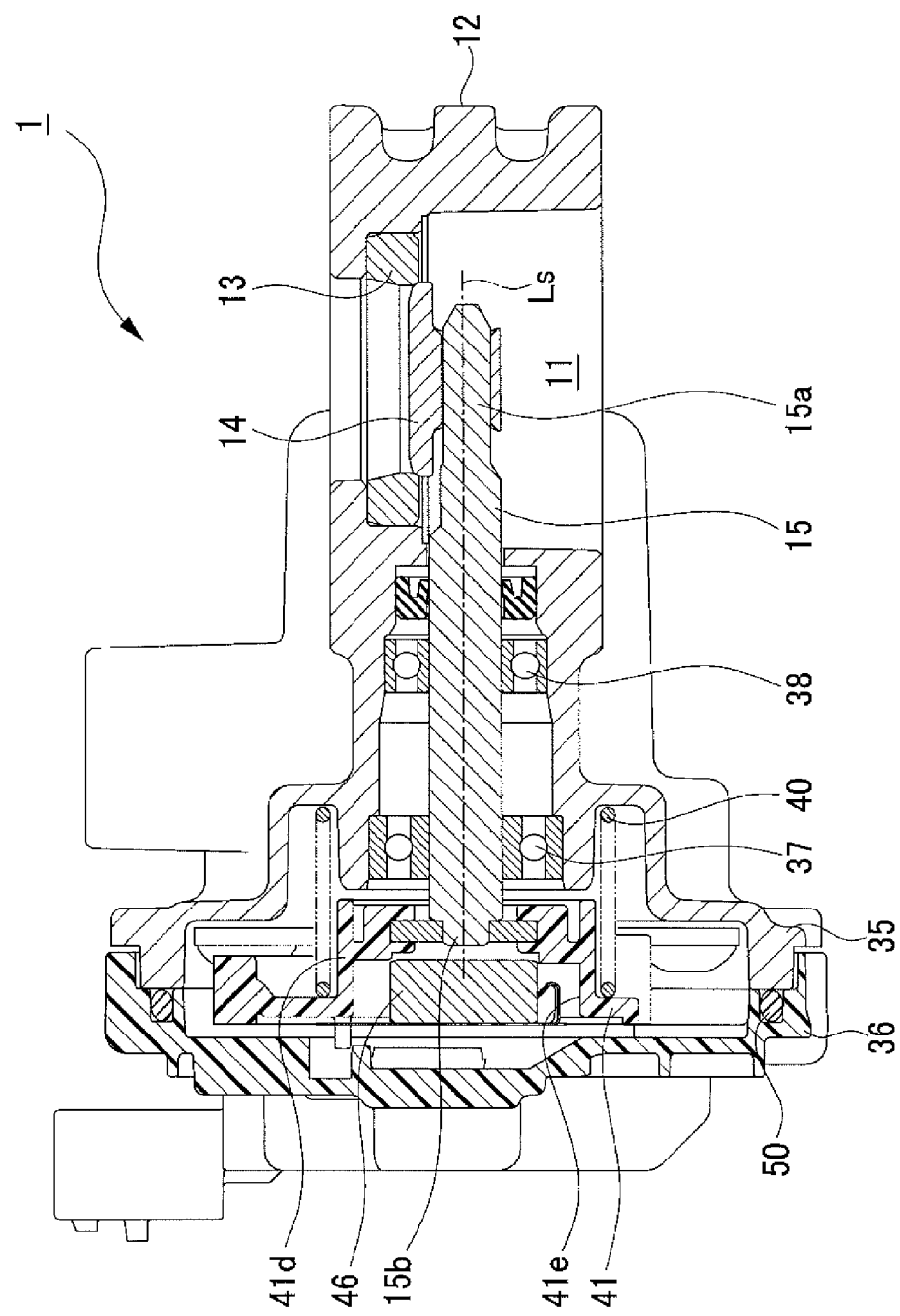
FIG. 8 is a cross-sectional view taken along a line C-C in FIG. 1.
Figure 9:
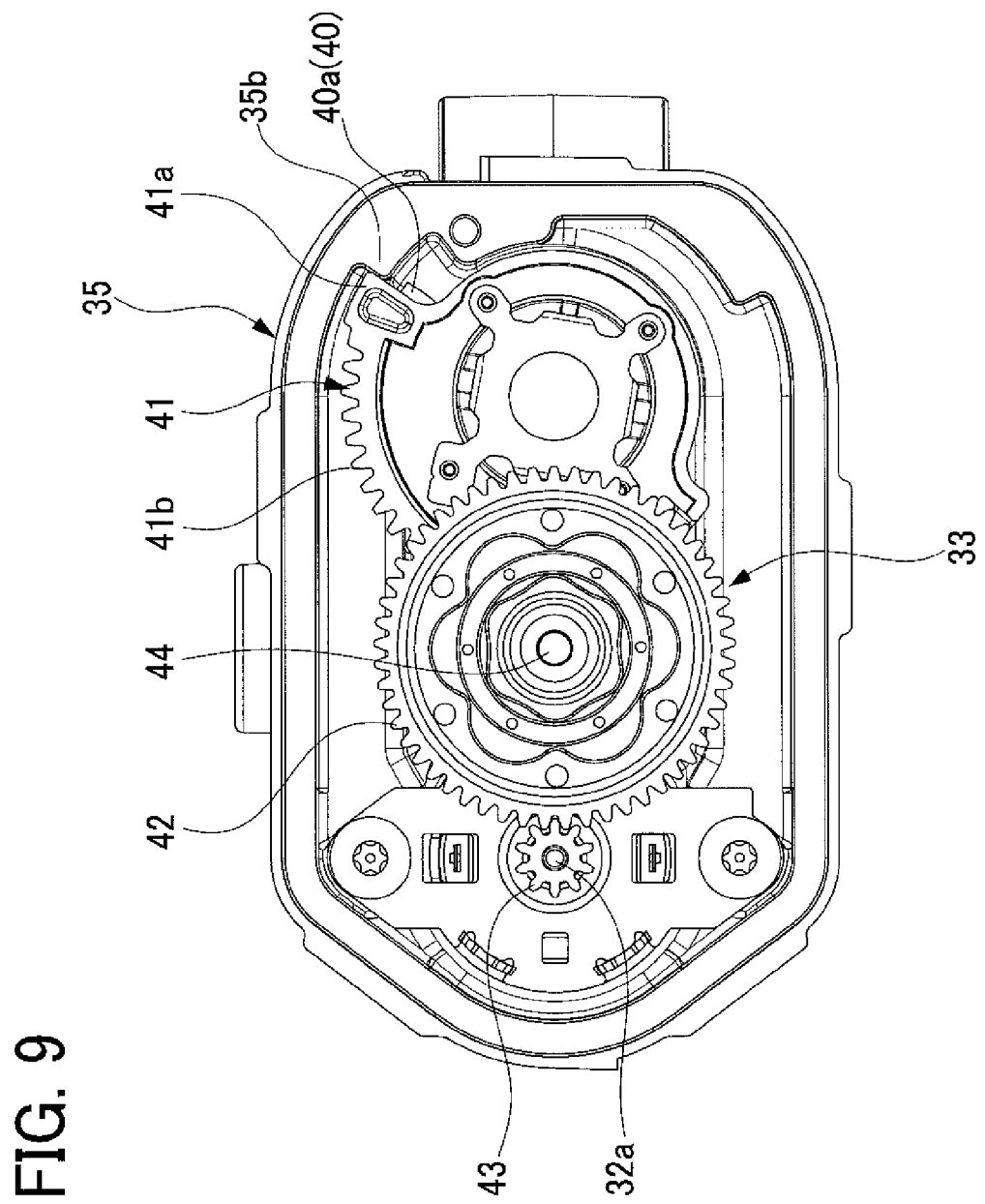
FIG. 9 is a front view showing a state where an end frame has been detached from a valve housing.

As shown in FIGS. 7 and 8, a valve housing 35 made of metal or synthetic resin is provided with the flow passage 11 and the pipe part 12. An end frame 36 made of metal or synthetic resin closes an open end of the valve housing 35. The valve element 14 and the rotary shaft 15 are provided in the valve housing 35. The rotary shaft 15 includes a pin 15a protruding from a distal end of the rotary shaft 15. Specifically, the pin 15a is provided at one end of the rotary shaft 15 (on a side close to the valve element 14) in a direction of the central axis Ls (see FIG. 8). At the other end of the rotary shaft 15 (on a side close to the main gear 41) in the direction of the central axis Ls, there is provided a proximal end portion 15b.

The rotary shaft 15 has a free end on a distal end side provided with the pin 15a, so that the distal end is inserted and placed in the flow passage 11 of the pipe part 12. The rotary shaft 15 is supported by a cantilever structure with a first bearing 37 and a second bearing 38 and in rotatable manner with respect to the valve housing 35 through the first bearing 37 and the second bearing 38. The first bearing 37 and the bearing 38 are each constituted of a ball bearing. The first bearing 37 and the second bearing 38 are placed in respective positions between the valve element 14 and the main gear 41 along the central axis Ls of the rotary shaft 15 to rotatably support the rotary shaft 15. The valve element 14 is fixed by welding to the pin 15a formed at the distal end of the rotary shaft 15 and is placed in the fixed flow passage 11.

The end frame 36 is fixed to the valve housing 35 with a plurality of clips 39 (see FIGS. 1 and 2). As shown in FIGS. 7 and 8, to the proximal end portion 15b of the rotary shaft 15, a main gear 41 provided with a fan-shaped gear is fixed. There is a provided a return spring 40 between the valve housing 35 and the main gear 41 to generate return spring force Fs1 (see FIG. 11). The return spring force Fs1 is a force to rotate the rotary shaft 15 in a valve closing direction and also a force to urge the valve element 14 in the valve closing direction.

Figure 10:
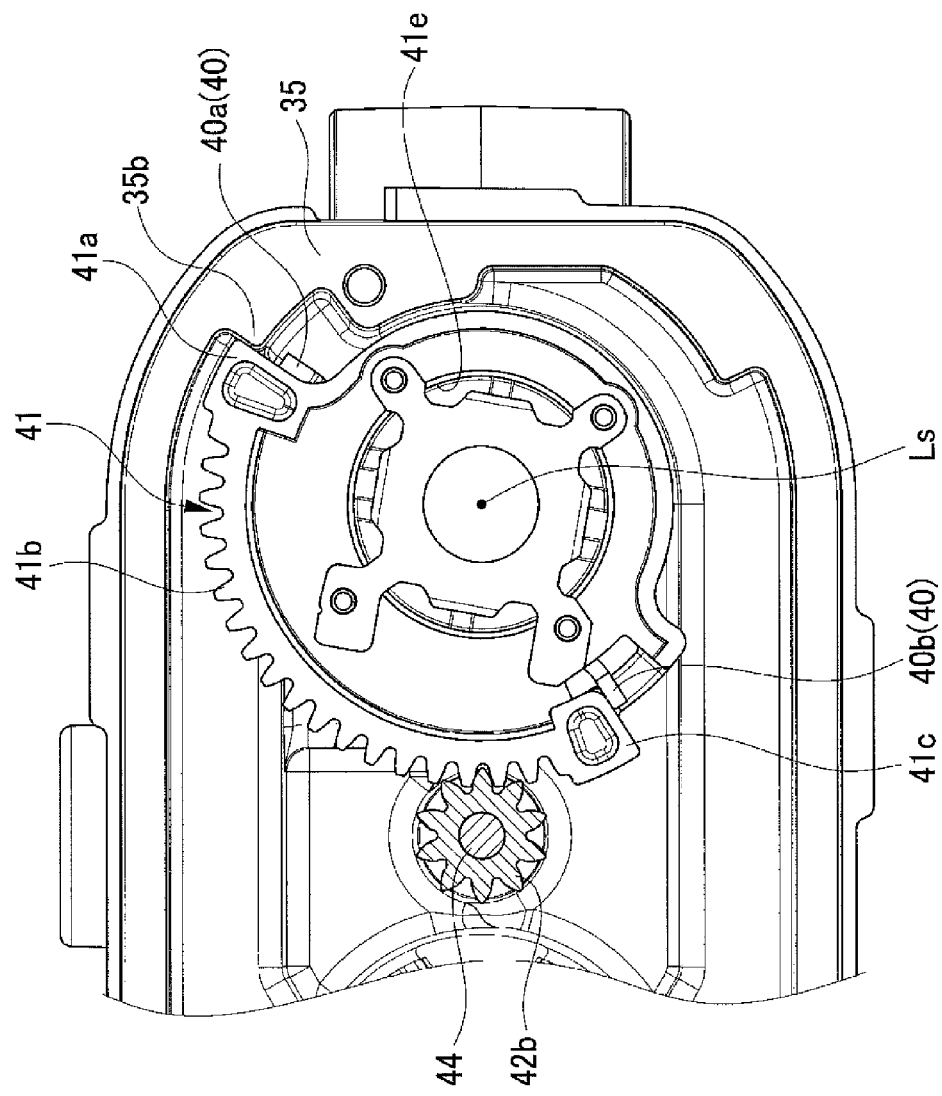
FIG. 10 is an enlarged view (a partially-cutaway view) of a main gear, a return spring, and an intermediate gear during non-operation of a motor.
Figure 18:
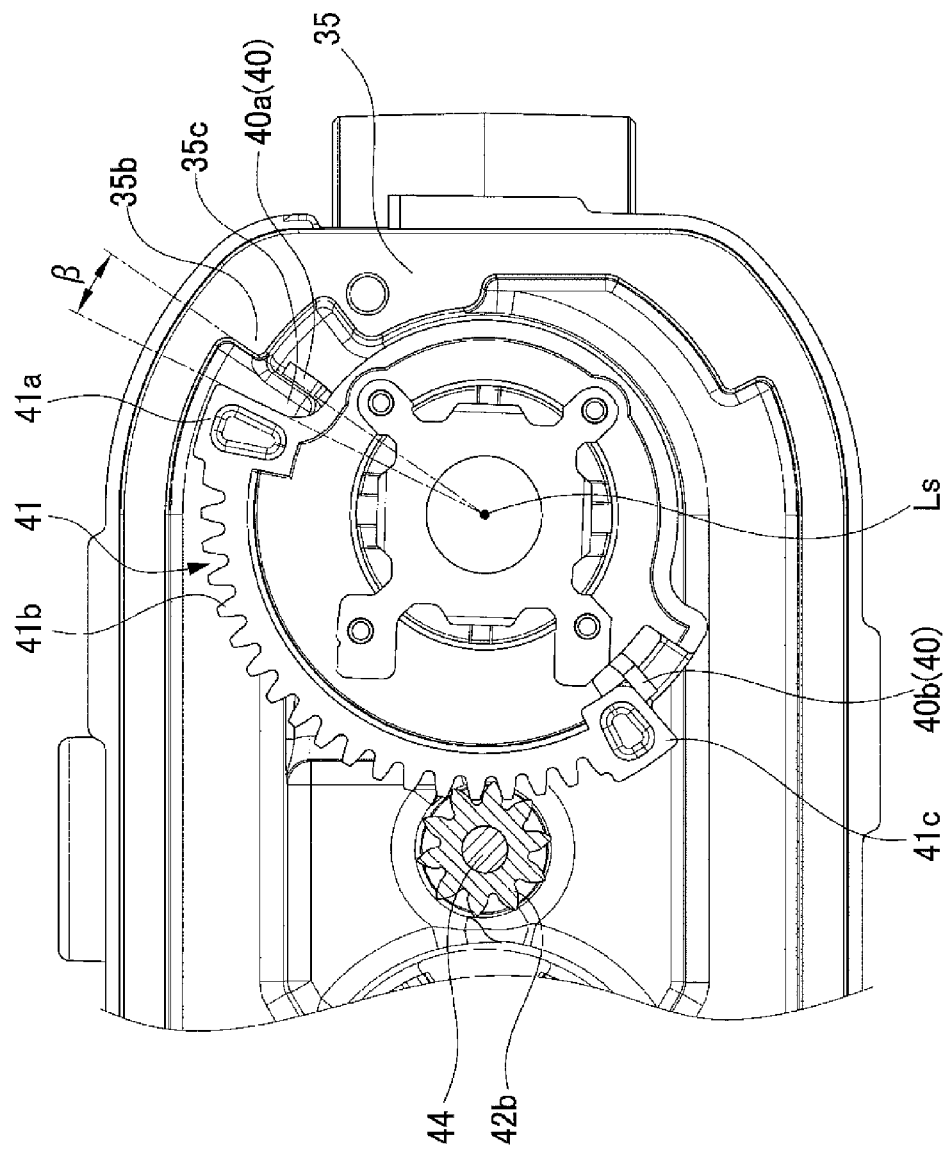
FIG. 18 is an enlarged view (a partially-cutaway view) of the main gear, the return spring, the intermediate gear, and their surrounding parts at a valve opening degree of β during operation of the motor.

The return spring 40 is an elastic member made of wire wound in a coil shape and is provided, at both ends with a far-side hook 40a and a near-side hook 40b. As shown in FIG. 10, the far-side hook 40a and the near-side hook 40b are spaced at an interval of about 180° in a circumferential direction of the return spring 40. The far-side hook 40a is located on a valve housing 35 side (on a far-side of a drawing sheet of FIG. 10) so that it contacts a spring hook part 35c (see FIG. 18) of the valve housing 35. In contrast, the near-side hook 40b is located on a main gear 41 side (on a near-side of the drawing sheet of FIG. 10) so that it contacts a spring hook part 41c of the main gear 41.

As shown in FIGS. 7 to 10, the main gear 41 includes a full-close stopper part 41a, a gear part 41b, the spring hook part 41c, a spring guide part 41d, and others. In the circumferential direction (a counterclockwise direction in FIG. 10) of the main gear 41, the full-close stopper part 41a, the gear part 41b, and the spring hook part 41c are arranged in this order. The main gear 41 is integrally provided with the rotary shaft 15 and is configured to receive drive force generated by the motor 32. The full-close stopper part 41a is a part that abuts on the full-close stopper part 35b of the valve housing 35 when a valve opening degree θ is 0.

The valve opening degree θ is a rotation angle of the rotary shaft 15 rotated about the central axis Ls and corresponds to a rotation angle of the main gear 41, an opening angle of the valve element 14, or an opening degree of the EGR valve. In other words, the time when the valve opening degree θ is 0 represents the time when the rotation angle of the rotary shaft 15 is a minimum angle within a rotatable range of the rotary shaft 15. FIGS. 7 to 10 show the time when the valve opening degree θ is 0.

As shown in FIG. 10, the gear part 41b meshes with a small-diameter gear 42b of an intermediate gear 42. The spring hook part 41c contacts with the near-side hook 40b of the return spring 40 and receives the return spring force Fs1 from the near-side hook 40b (see FIG. 11).

As shown in FIG. 8, the spring guide part 41d is placed in the coiled return spring 40 to support the return spring 40. The spring guide part 41d is integrally provided, at a portion located close to a proximal end 15b of the rotary shaft 15, with the rotary shaft 15.

The main gear 41 includes a recess 41e in which a magnet 46 having a substantially disk shape is mounted as shown in FIG. 8. Therefore, when the main gear 41 rotates together with the valve element 14 and the rotary shaft 15, the magnet 46 is also rotated, changing a magnetic field of the magnet 46. This change in the magnetic field of the magnet 46 is detected by a rotation angle sensor (not illustrated), so that the rotation angle of the main gear 41 is detected as the opening degree of the valve element 14, that is, the opening degree of the EGR valve.

As shown in FIG. 7, the motor 32 is accommodated and fixed in a holding cavity 35a formed in the valve housing 35. The motor 32 is drivingly coupled to the rotary shaft 15 through the speed reducing mechanism 33 to operate the valve element 14 to open and close. Specifically, an output shaft 32a (see FIG. 9) of the motor 32 is fixedly provided with a motor gear 43. This motor gear 43 is drivingly coupled to the main gear 41 through the intermediate gear 42. The motor 32 generates drive force to rotate the rotary shaft 15 in a valve opening direction and in a valve closing direction.

The intermediate gear 42 is a double gear having a large-diameter gear 42a and the small-diameter gear 42b and is rotatably supported by the valve housing 35 through a pin shaft 44. The large-diameter gear 42a is drivingly engaged with the motor gear 43, while the small-diameter gear 42b is drivingly engaged with the main gear 41. In the present embodiment, each of the gears 41 to 43 constituting the speed reducing mechanism 33 is a plastic gear made of resin material for weight saving.

The motor 32 is one example of a "drive mechanism" in the present invention. Further, the intermediate gear 42 transmits the drive force of the motor 32 to the rotary shaft 15 and corresponds to one example of a "drive transmission part" in the present invention.

In the EGR valve 1 configured as above, when the motor 32 is energized from a state where the valve element 14 is in a fully closed position as shown in FIG. 3, the force pushing the gear teeth (the motor drive force Fm1 (see FIG. 13)) is exerted on the main gear 41, thereby moving the rotary shaft 15 (the valve element 14) in a direction toward the valve seat 13 by the principle of leverage. Thereafter, when the drive voltage (current) applied to the motor 32 is gradually raised, the output shaft 32a and the motor gear 43 are rotated in a forward direction (i.e., a direction to open the valve element 14) and this rotation is reduced in speed and then transmitted to the main gear 41. Accordingly, the valve element 14 is opened against the return spring force Fs1 that is generated by the return spring 40 and that urges the valve element 14 in the valve closing direction. The flow passage 11 is thus opened. Thereafter, when the drive voltage applied to the motor 32 is maintained at a constant level in the process of opening the valve element 14, the motor drive force Fm1 and the return spring force Fs1 become balanced with each other at the opening degree of the valve element 14 at that time, so that the valve element 14 is held at a predetermined opening degree.

More details of the operations of the EGR valve 1 in the present embodiment will be described below. During non-operation of the motor 32 that is not energized (i.e., during the time when the motor 32 is stopped), the valve opening degree θ is 0 (the valve-closed state of the rotary shaft 15). At that time, as shown in FIG. 10, the full-close stopper part 41a of the main gear 41 contacts with the full-close stopper part 35b of the valve housing 35. During that period, the engine is stopped.

Figure 11:
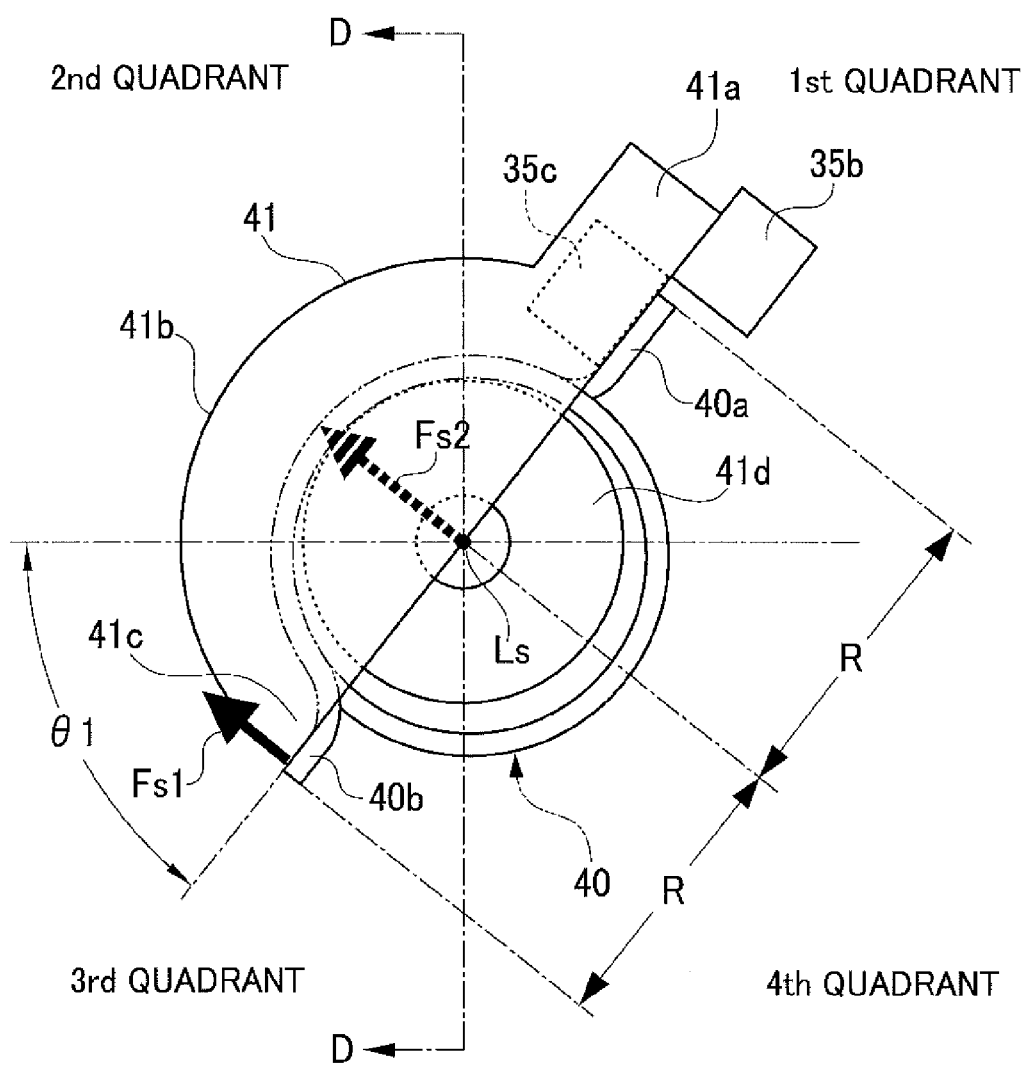
FIG. 11 is a schematic view showing forces acting on the main gear during non-operation of the motor and seen from a main gear side in a central axis direction of a rotary shaft.

The relationship of forces in terms of a circumferential direction of, or around, the rotary shaft 15 during the non-operation of the motor 32 is considered as below. The spring hook part 41c of the main gear 41 receives the return spring force Fs1 from the near-side hook 40b of the return spring 40 as shown in FIG. 11. As shown in FIG. 11, in a rectangular or Cartesian coordinate system consisting of an origin represented by the central axis Ls of the rotary shaft 15, an x-axis represented by a horizontal line, and a y-axis represented by a vertical line, a first quadrant is a part defined by a +x axis and a +y axis, a second quadrant is a part defined by a −x axis and the +y axis, a third quadrant is a part defined by the −x axis and a −y axis, and a fourth quadrant is a part defined by the +x axis and the −y axis. During the non-operation of the motor 32, the far-side hook 40a and the full-close stopper part 41a are placed in a position corresponding to the first quadrant, and the near-side hook 40b and the spring hook part 41c are placed in a position corresponding to the third quadrant.

Herein, based on the principle of leverage, a fulcrum (a pivot point) is set in the full-close stopper part 41a, a point of effort is set in the spring hook part 41c, and a point of load is set in a middle part between the full-close stopper part 41a and the spring hook part 41c. Thus, the return spring force Fs1 causes a force Fs2 to act on the middle part between the full-close stopper part 41a and the spring hook part 41c. This is expressed by: "Force Fs2"=2×"Return spring force Fs1". In FIG. 11, the distance between the full-close stopper part 41a and the spring hook part 41c is set to "2R".

Figure 12:
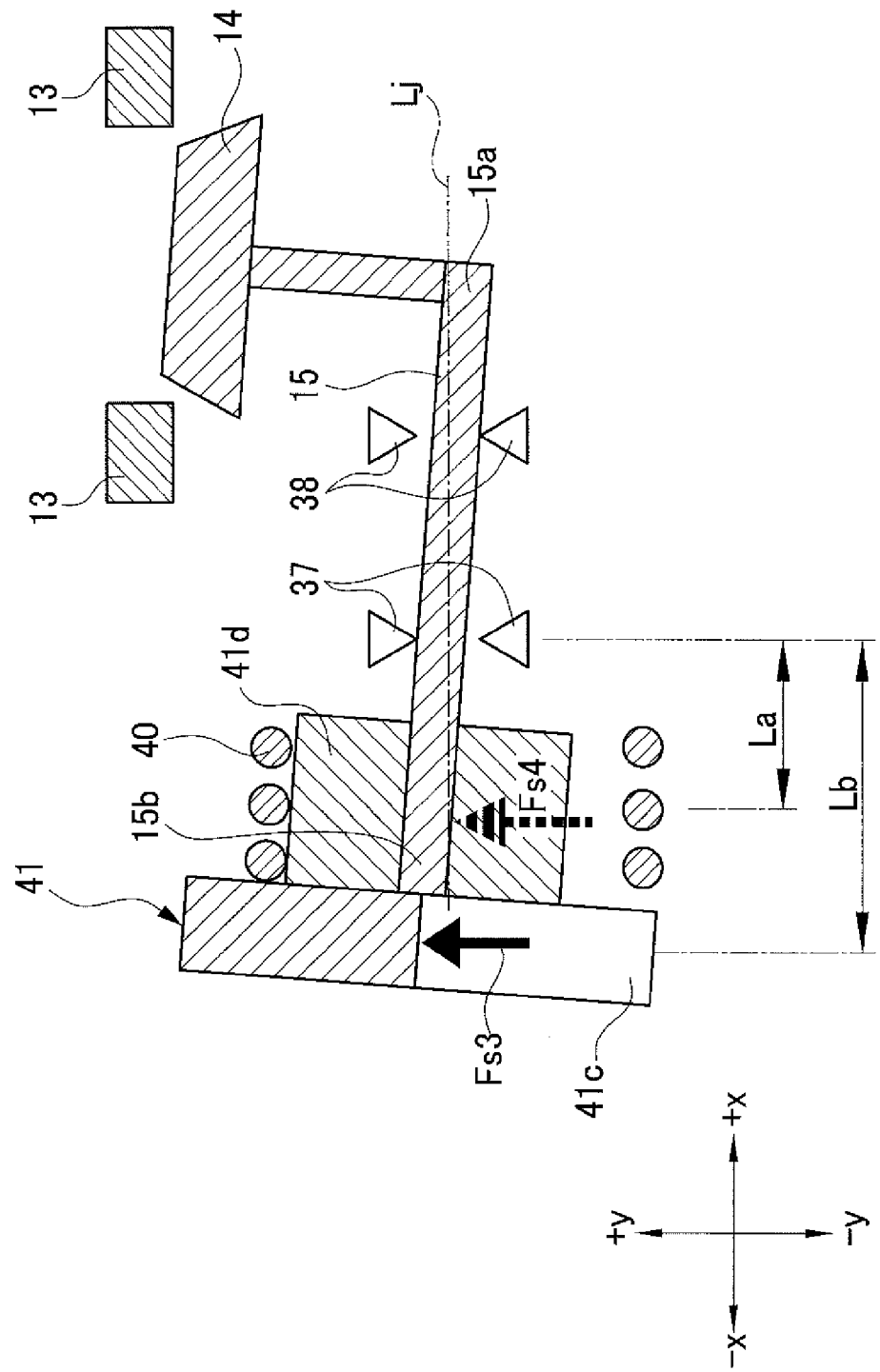
FIG. 12 is a schematic view representing the valve seat, the valve element, the rotary shaft, bearings, and the main gear, showing a cross-sectional view taken along a line D-D in FIG. 11.

The relationship of forces in terms of a cross section of the rotary shaft 15 taken along the central axis Ls during the non-operation of the motor 32 is also considered as below. A +y direction component of the force Fs2 is a component force Fs3 as shown in FIG. 12. The +y direction represents a direction perpendicular to the central axis Lj direction of the first bearing 37 and the second bearing 38 (the x direction) and a direction toward which the valve seat 13 is placed relative to the valve element 14 (an upward direction in the drawing sheets of FIGS. 11 and 12). This is expressed by: "Component force Fs3"="Force Fs2"×"sin θ1". The angle θ1 is an angle formed between the arrangement direction in which the full-close stopper part 41a and the spring hook part 41c are arranged and the x direction as shown in FIG. 11.

This component force Fs3 causes a force Fs4 (separating-direction urging force) to act on the spring guide part 41d in the +y direction. This is expressed by: "Force Fs4"="Component force Fs3"×Lb/La. In this way, the force Fs4 is a force that is caused by the return spring force Fs1 and acts in a direction perpendicular to the central axis Lj of the first bearing 37 and the second bearing 38. The distance La is a distance from a position in which the first bearing 37 is placed to a position on which the force Fs4 acts in the x direction. The distance Lb is a distance from the position where the first bearing 37 is placed to a position on which the force Fs3 acts in the x direction.

Figure 19:
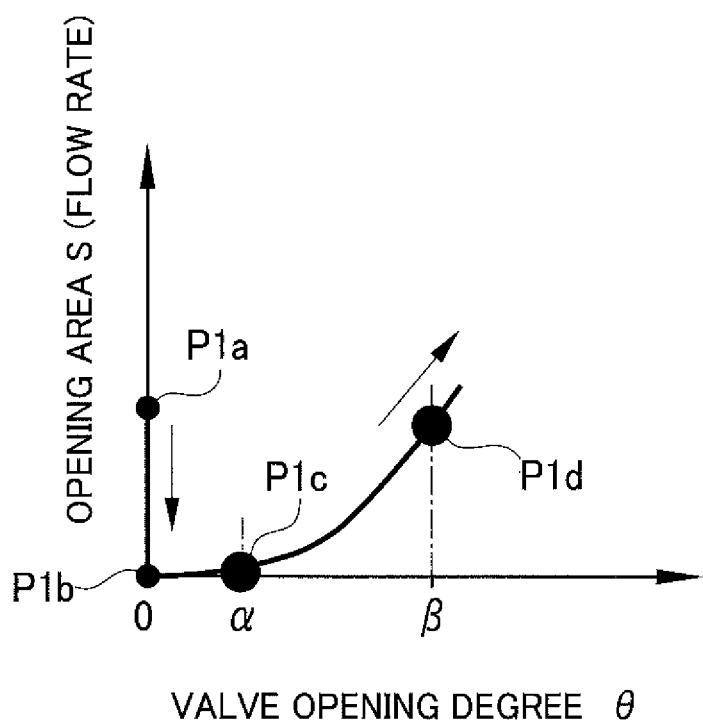
FIG. 19 is a graph showing a relationship between valve opening degree and open area.

When the force Fs4 acts in the +y direction in the position of the spring guide part 41d, the rotary shaft 15 integral with the spring guide part 41d is caused to turn and incline clockwise in FIG. 12 about the first bearing 37 serving as the fulcrum. Accordingly, by the principle of leverage, the main gear 41 provided in the proximal end 15b of the rotary shaft 15 is moved in the +y direction, while the valve element 14 provided in the pin 15a of the rotary shaft 15 is moved in the −y direction. Therefore, the valve element 14 is moved in a direction away from the valve seat 13 (a separating direction). Further, at that time, the rotary shaft 15 is restrained by the second bearing 38 from further inclining. Thus, the valve element 14 is stopped at a position separated by a slight distance from the valve seat 13. In the above manner, during the time when the motor 32 is not operated and the rotary shaft 15 is in the valve closed state, a slight gap is generated between the valve seat 13 and the valve element 14. The valve element 14 at that time is located at a position represented by a point P1a in FIG. 19 showing a relationship between the valve opening degree θ and the open area S. Herein, the time when the rotary shaft 15 is in the valve closed state corresponds to the time when the valve opening degree θ (the opening degree of the valve element 14) is 0, that is, the time when the rotation angle of the rotary shaft 15 is an angle during valve closing (the minimum angle within the rotatable angle of the rotary shaft 15).

Figure 13:
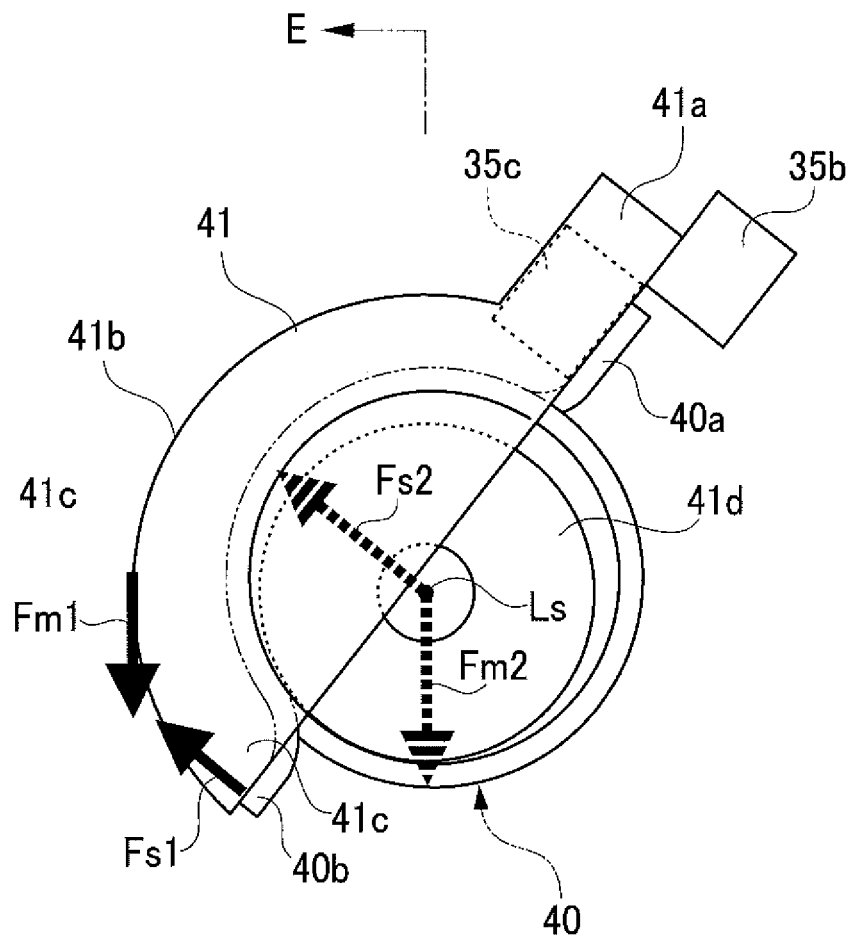
FIG. 13 is a schematic view showing forces acting on the main gear during operation of the motor and seen from the main gear side in the central axis direction of the rotary shaft.

Thereafter, during operation of the motor 32, namely, when the motor 32 is energized, the motor drive force Fm1 acts from the small-diameter gear 42b (see FIG. 10) of the intermediate gear 42 to the gear part 41b (see FIG. 10) to rotate the main gear 41. When seen from the force relationship in terms of the circumferential direction of the rotary shaft 15 at that time, the motor drive force Fm1 acts in the −y direction as shown in FIG. 13. This −y direction is a perpendicular direction to the central axis Lj direction (the x direction) of the first bearing 37 and the second bearing 38 and a direction toward which the valve element 14 is placed relative to the valve seat 13 (a downward direction in the drawing sheets of FIGS. 11 and 12).

Figure 14:
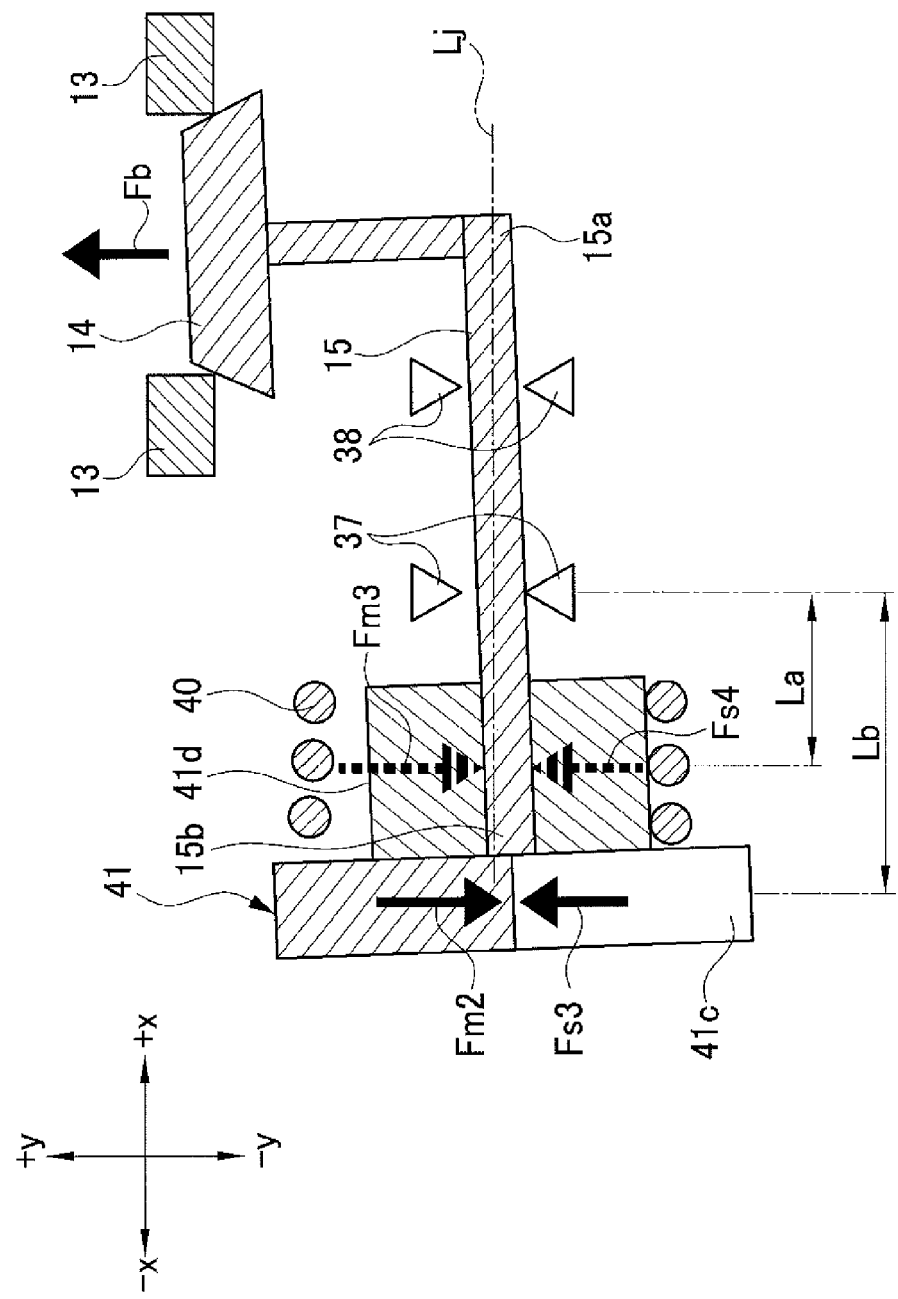
FIG. 14 is a schematic view representing the valve seat, the valve element, the rotary shaft, the bearings, and the main gear, showing a cross-sectional view taken along a line E-E in FIG. 13.

The motor drive force Fm1 causes the force Fm2 to act in the −y direction at the position of the central axis Ls of the rotary shaft 15. Further, when seen from the force relationship in terms of the cross section of the rotary shaft 15 taken along the central axis Ls, a force Fm3 (seating-direction urging force) acts in the −y direction at the position of the spring guide part 41d as shown in FIG. 14. This is expressed by: "Force Fm3"="Force Fm2"×Lb/La. During operation of the motor 32, in the above manner, the force Fm3 is generated. This force Fm3 is a force that is caused by the motor drive force Fm1 and that acts in a direction perpendicular to the central axis Lj of the first bearing 37 and the second bearing 38. The force Fm3 causes the rotary shaft 15 to turn and incline about the first bearing 37 serving as the fulcrum, thereby urging the valve element 14 in a direction toward the valve seat 13.

As shown in FIG. 14, when the force Fm3 becomes larger than the force Fs4, the rotary shaft 15 integral with the spring guide part 41d of the main gear 41 is caused to turn and incline counterclockwise in FIG. 14 about the first bearing 37 serving as the fulcrum. Accordingly, by the principle of leverage, the main gear 41 is moved in the −y direction, while the valve element 14 moves in the +y direction. Therefore, the valve element 14 is moved in a direction toward the valve seat 13 (a seating direction) by the force Fm3. In the present embodiment, the valve element 14 gets seated on the valve seat 13. The valve element 14 at that time is located at a position represented by a point P1b in FIG. 19 showing the relationship between the valve opening degree θ and the open area S. At that time, when an engine (not illustrated) is being driven, the valve element 14 is assisted by differential pressure Fb between an upstream side and a downstream side of the valve element 14.

Figure 15:
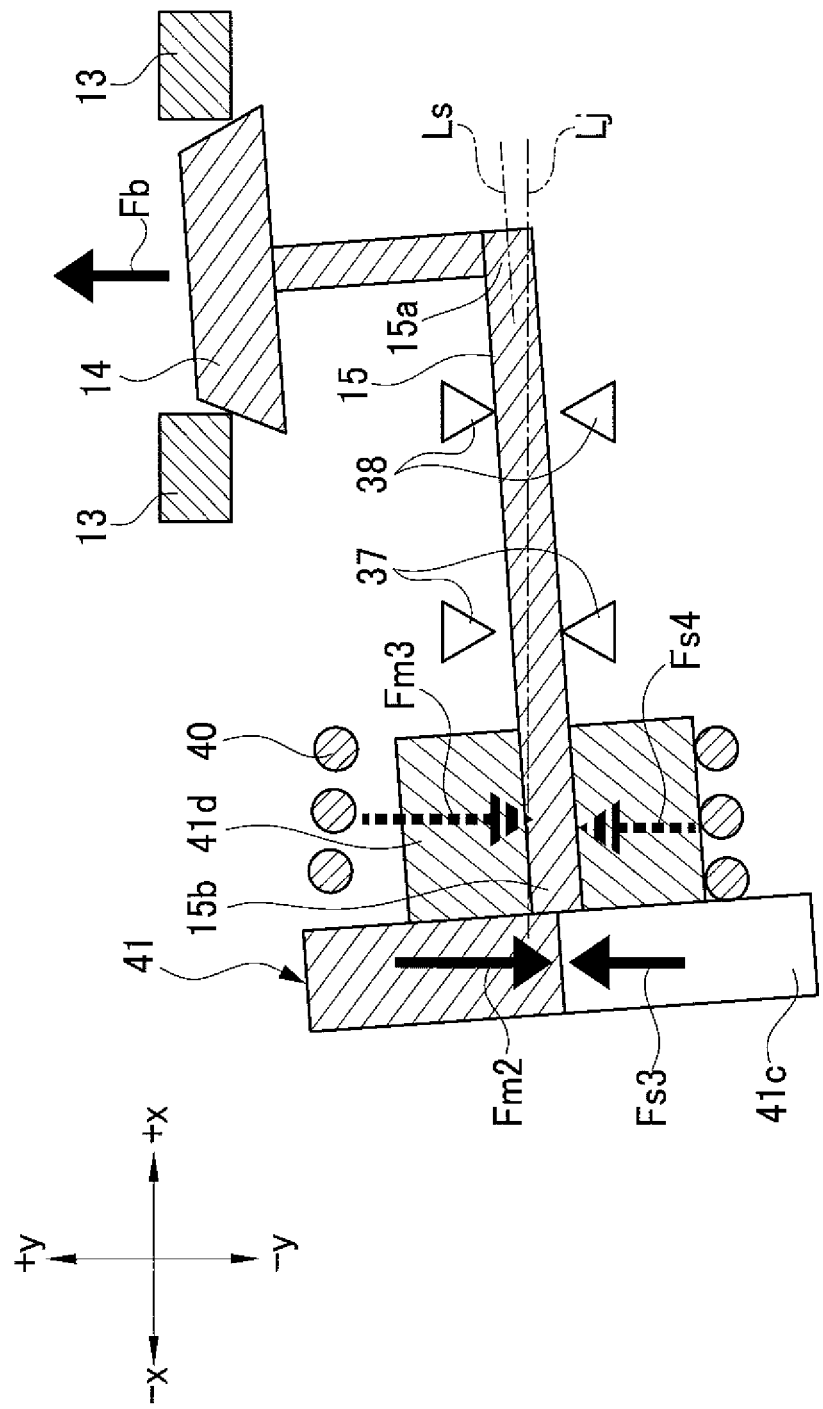
FIG. 15 is a diagram corresponding to FIG. 14, and representing a case where a motor drive force is set larger than that in FIG. 14.
Figure 16:
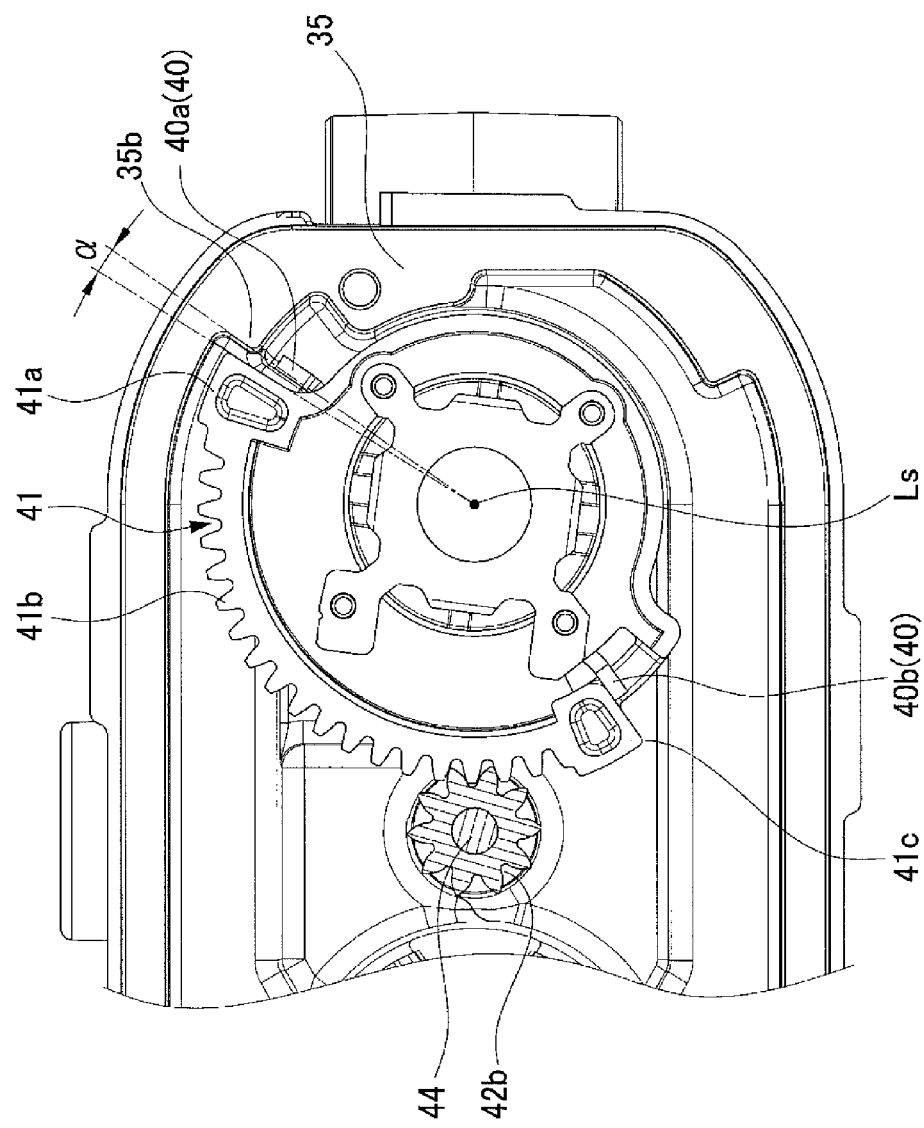
FIG. 16 is an enlarged view (a partially-cutaway view) of the main gear, the return spring, the intermediate gear, and their surrounding parts at a valve opening degree of α during operation of the motor.

Thereafter, when the drive voltage to be applied to the motor 32 rises and thus the motor drive force Fm1 become large, the rotary shaft 15 is caused to further turn and incline counterclockwise in FIG. 15 about the first bearing 37 serving as the fulcrum. Accordingly, the main gear 41 is further moved in the −y direction, while the valve element 14 is further moved in the +y direction. Thus, the valve element 14 is further moved in the direction toward the valve seat 13, and the rotary shaft 15 is restrained by the second bearing 38 from further inclining. At that time, the rotary shaft 15 is rotated about the central axis Ls while the valve element 14 remains seated on the valve seat 13, so that the valve opening degree θ (the rotation angle of the rotary shaft 15) becomes "a" (see FIG. 16) and the open area S increases. In this state, the full-close stopper part 41a of the main gear 41 separates from the full-close stopper part 35b of the valve housing 35 as shown in FIG. 16. The valve element 14 at that time is located at a position represented by a point P1c in FIG. 19 showing the relationship between the valve opening degree θ and the open area S.

Figure 17:
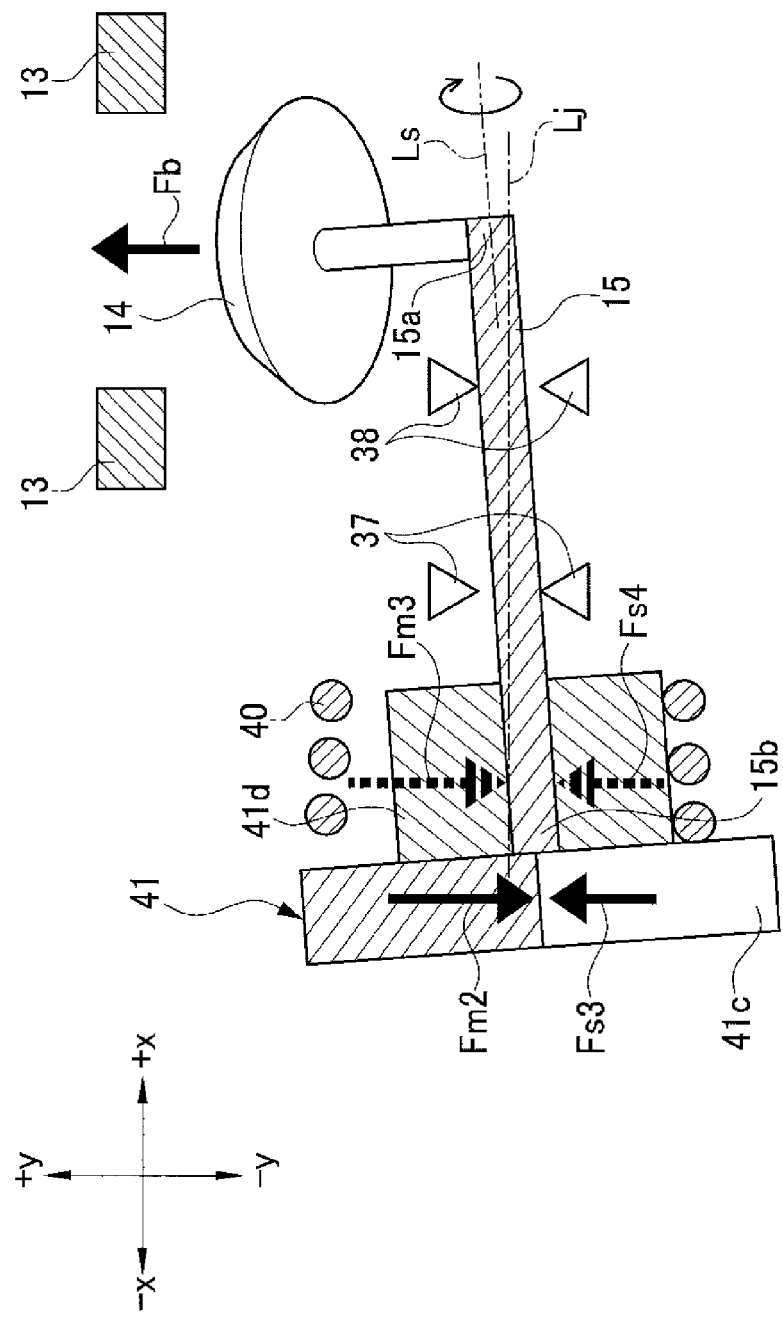
FIG. 17 is a diagram corresponding to FIG. 15, and representing a case where a motor drive force is set larger than that in FIG. 15.

Thereafter, as the motor drive force Fm1 becomes larger, the rotary shaft 15 is further rotated about the central axis Ls. This causes the valve element 14 to separate from the valve seat 13 as shown in FIG. 17, further increasing the open area S. At that time, the valve opening degree θ becomes "β" (see FIG. 18). The valve element 14 at that time is located at a position represented by a point P1d in FIG. 19 showing the relationship between the valve opening degree θ and the open area S. In the above manner, the valve opening operation of the EGR valve 1 is performed by the motor drive force Fm1.

In the present embodiment, the EGR valve 1 includes the two, first and second, bearings 37 and 38. Instead of these first and second bearings 37 and 38, a single bearing may be installed or three or more bearings may be installed.

The EGR valve 1 configured as above in the present embodiment generates the force Fs4 during non-operation of the motor 32. This force Fs4 is a force that is caused by the return spring force Fs1 and that acts in a perpendicular direction to the central axis Lj of the first bearing 37. The force Fs4 causes the rotary shaft 15 to turn and incline about the first bearing 37 serving as the fulcrum, thereby biasing the valve element 14 in the direction away from the valve seat 13.

Accordingly, when the EGR valve 1 is in the valve closed state during engine stop and non-operation of the motor 32, a slight gap is generated between the valve seat 13 and the valve element 14. Thus, even when deposits adhere to the valve seat 13 or the valve element 14, the valve seat 13 and the valve element 14 are prevented from sticking to each other. Further, sticking between the valve seat 13 and the valve element 14 due to freezing is also prevented. This can achieve stable opening and closing operations of the EGR valve 1. Since the valve element 14 is moved in the direction away from the valve seat 13 by the force Fs4, in case foreign matters are caught between the valve seat 13 and the valve element 14 during the valve closing operation, the foreign matters are allowed to fall away. Thus, no biting occurs between the valve seat 13 and the valve element 14. Consequently, sticking between the valve seat 13 and the valve element 14 can be prevented reliably.

According to the present embodiment, moreover, there is no need to provide special components (e.g., a spring) for separating the valve element 14 from the valve seat 13 in addition to the return spring 40. This can achieve reduced cost.

In the present embodiment, only the return spring force Fs1 acts during non-operation of the motor 32. Thus, even when the rotary shaft 15 is caused to turn and incline about the first bearing 37 serving as the fulcrum, only a small force acts on the first bearing 37. The first bearing 37 is therefore less damaged.

In the present embodiment, to be specific, the force Fs4 is generated when the motor 32 is not operated and the rotary shaft 15 is in the valve closed state. Herein, the time "when the rotary shaft 15 is in the valve closed state" corresponds to the time when the valve opening degree θ is 0.

In the present embodiment, the force Fm3 is generated when the motor 32 is operated. This force Fm3 is the force that is caused by the motor drive force Fm1 and that acts in the direction perpendicular to the central axis Lj of the first bearing 37. The force Fm3 causes the rotary shaft 15 to turn and incline about the first bearing 37 serving as the fulcrum, thereby biasing the valve element 14 in the direction toward the valve seat 13.

Accordingly, the open area S (the gap between the valve seat 13 and the valve element 14) at the initial stage of the valve opening operation is decreased. This can reduce a flow rate when the opening degree of the valve element 14 is small (when the valve opening degree θ is small). Thus, the accuracy of flow control with the valve element 14 at a small opening degree can be enhanced.

In the present embodiment, the valve element 14 is seated on the valve seat 13 by the force Fm3. To be specific, the EGR valve 1 operates to seat the valve element 14 once on the valve seat 13 by the force Fm3 and then open the valve element 14.

Thus, the open area S at the initial stage of valve opening can be further decreased. Accordingly, the flow rate when the valve element 14 is at a small opening degree can be further decreased. The accuracy of the flow control with the valve element 14 at the small opening degree can be further enhanced.

In the present embodiment, the EGR valve 1 may be configured to control the opening degree of the valve element 14 relative to a reference position determined by an opening degree of the valve element 14 positioned to allow fluid to flow at a predetermined flow rate. In the EGR valve 1, for instance, the flow control is performed by controlling the valve opening degree θ relative to a (see FIG. 19). A control unit 50 (see FIG. 1) for performing this control is installed in the EGR valve 1 or provided separately from the EGR valve 1. Accordingly, variations in flow rate at the reference position for the flow control are reduced, resulting in enhanced accuracy of the flow rate with respect to the valve opening degree θ.

Further, the EGR valve 1 may be configured to control the opening degree of the valve element 14 relative to the reference position determined by an opening degree of the valve element 14 positioned in the valve closed state. In the EGR valve 1, for example, the flow control is performed by controlling the valve opening degree θ with reference to 0. The control unit 50 for performing this control is installed in the EGR valve 1 or provided separately from the EGR valve 1. Accordingly, the reference position for the flow control is unambiguously determined, resulting in enhanced accuracy of the flow rate with respect to the valve opening degree θ.

Further, the EGR valve 1 includes the intermediate gear 42 placed between the motor 32 and the main gear 41. The intermediate gear 42 transmits the drive force of the motor 32 from the motor 32 to the main gear 41.

Accordingly, the drive force from the motor 32 is increased by the intermediate gear 42 and such an increased drive force is transmitted to the main gear 41. Therefore the drive force to be generated by the motor 32 can be reduced, resulting in downsizing of the motor 32.

Figure 20:
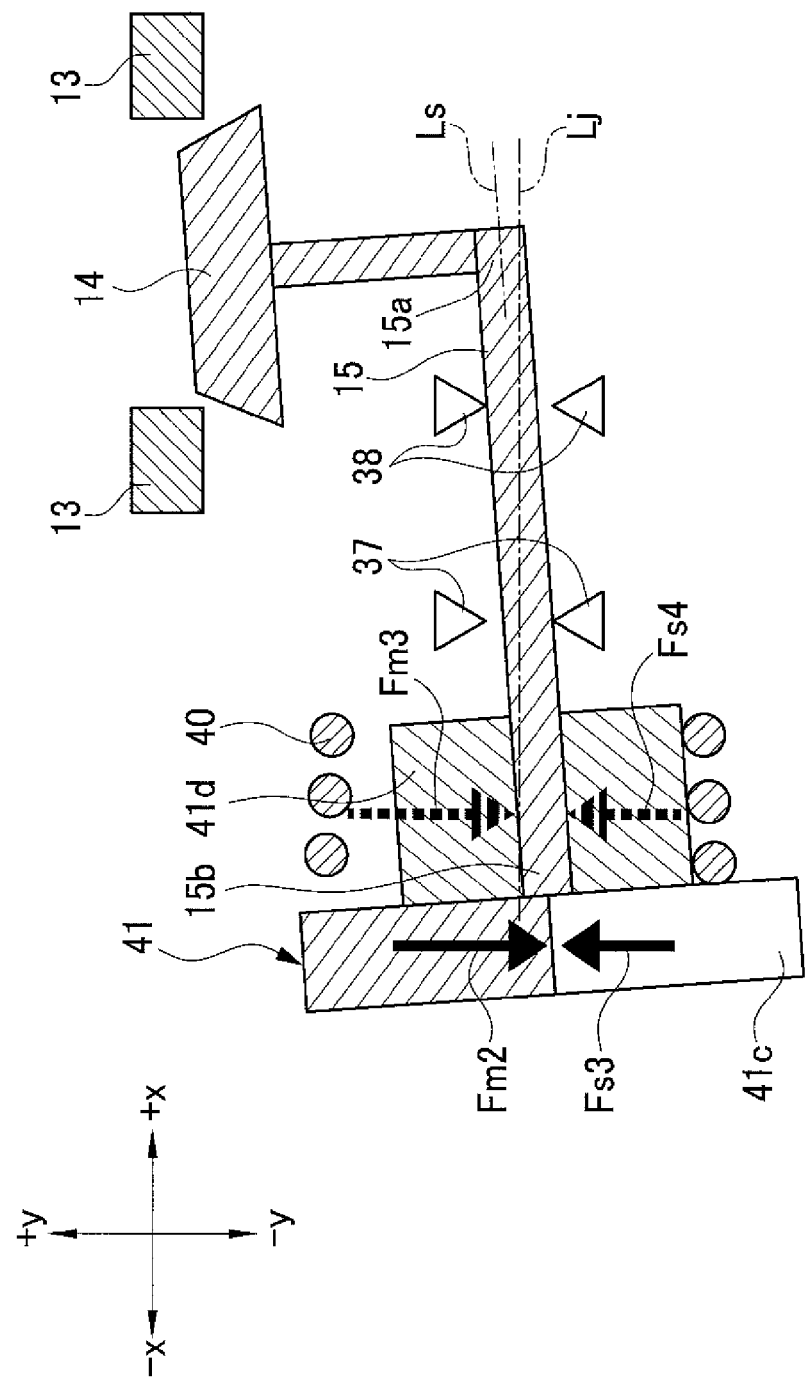
FIG. 20 is a schematic view of a valve seat, a valve element, a rotary shaft, bearings, and main gear in a modified example.

The following modified example is also adoptable. In this modified example, as shown in FIG. 20, in the EGR valve 1 in the valve closed state (the valve opening degree θ is 0), even when the force Fm3 is caused by the motor drive force Fm1, urging the valve element 14 toward the valve seat 13, the valve element 14 does not seat on the valve seat 13. Thus, the open area S is slightly generated. The valve element 14 at that time is located at a position represented by a point P2b in FIG. 21 showing the relationship between the valve opening degree θ and the open area S.

As above, when the valve element 14 is urged in a direction toward the valve seat 13 by the force Fm3 caused by the motor drive force Fm1, the open area S is slightly generated. Thus, the valve seat 13 and the valve element 14 are prevented from rubbing against each other during the valve opening operation.

Figure 21:
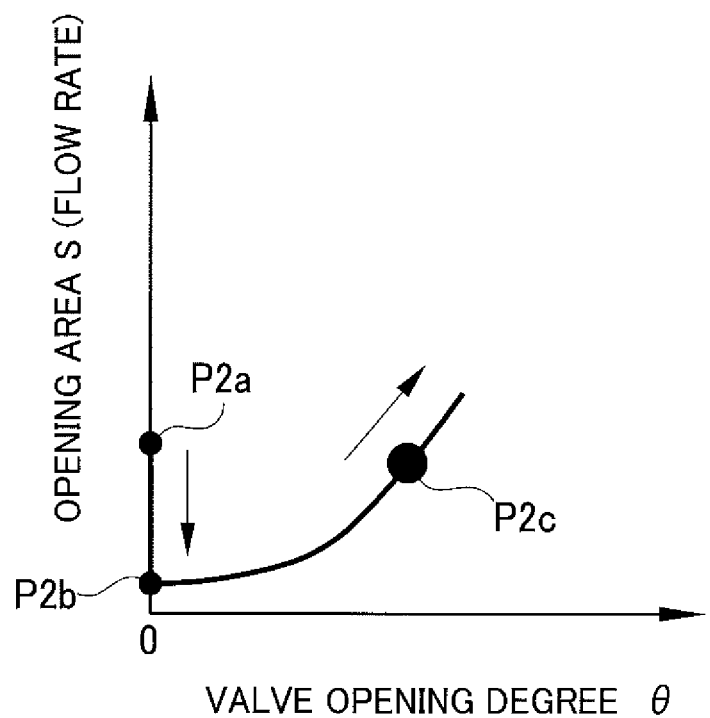
FIG. 21 is a graph showing a relationship between valve opening degree and open area in the modified example.

Thereafter, when the motor drive force Fm1 is further increased, the rotary shaft 15 is rotated, increasing the valve opening degree θ and the open area S as shown in FIG. 21. The valve element 14 at that time is located at a position represented by a point P2c in FIG. 21 showing the relationship between the valve opening degree θ and the open area S.

The aforementioned embodiments are mere examples and do not give any limitations to the present invention. Thus, various improvements and modifications may be available in a scope without departing from the essential characteristics thereof. For instance, the rotary shaft 15 may be supported by a both-ends-supported structure with the first bearing 37 and a bearing (not illustrated) separately provided on the opposite side of the valve element 14 from the first bearing 37.

REFERENCE SIGNS LIST

1 EGR valve
2 Valve unit
3 Drive mechanism
11 Flow passage
13 Valve seat
14 Valve element
15 Rotary shaft
15a Pin
15b Proximal end
16 Valve hole
17 Seat surface
18 Sealing surface
32 Motor
32 Speed reducing mechanism
35 Valve housing
35b Full-close stopper part
35c Spring hook part
37 First bearing
38 Second bearing
40 Return spring
40a Far-side hook
40b Near-side hook
41 Main gear
41a Full-close stopper part
41b Gear part
41c Spring hook part
41d Spring guide part
Ls Central axis (of rotary shaft)
Lv Central axis (of valve element)
Lj Central axis (of bearing)
Fs1 Return spring force
Fs4 Force
Fm1 Motor drive force
Fm3 Force
θ Valve opening degree

The invention claimed is:

1. A double eccentric valve comprising:
a valve seat including a valve hole and a seat surface formed at an edge of the valve hole;
a valve element formed with a sealing surface on an outer periphery corresponding to the seat surface;
a rotary shaft integrally provided with the valve element to rotate the valve element,
the rotary shaft having a central axis extending in parallel to a radial direction of the valve element and the valve hole, the central axis of the rotary shaft being positioned eccentrically from a center of the valve hole in another radial direction of the valve hole, and the sealing surface being positioned eccentrically from the central axis of the rotary shaft toward an extending direction of a central axis of the valve element,
wherein the double eccentric valve further comprises:
a drive mechanism configured to generate a drive force to rotate the rotary shaft in a valve opening direction;
a drive force receiving part integrally provided with the rotary shaft and configured to receive the drive force;
a bearing placed in a position between the valve element and the drive force receiving part in a direction of the central axis of the rotary shaft to support the rotary shaft; and
a return spring configured to generate a return spring force to rotate the rotary shaft in a valve closing direction, and
wherein, during non-operation of the drive mechanism, the double eccentric valve generates a separating-direction urging force to cause the rotary shaft to incline about the bearing serving as a fulcrum and urge the valve element in a direction away from the valve seat, the separating-direction urging force being a force caused by the return spring force and acting in a direction perpendicular to a central axis of the bearing.

2. The double eccentric valve according to claim 1, wherein
during operation of the drive mechanism, the double eccentric valve generates a seating-direction urging force to cause the rotary shaft to incline the rotary shaft about the bearing serving as the fulcrum and urge the valve element in a direction toward the valve seat, the seating-direction urging force being a force caused by the drive force and acting in a direction perpendicular to the central axis of the bearing.

3. The double eccentric valve according to claim 2, wherein the valve element is caused to seat on the valve seat by the seating-direction urging force.

4. The double eccentric valve according to claim 2, wherein the double eccentric valve is configured to control an opening degree of the valve element relative to a reference position determined by an opening degree of the valve element positioned to allow fluid to flow at a predetermined flow rate.

5. The double eccentric valve according to claim 2, wherein the double eccentric valve is configured to control an opening degree of the valve element relative to a reference position determined by an opening degree of the valve element positioned in a valve closed state.

6. The double eccentric valve according to claim 1, further comprising a drive transmission part placed between the drive mechanism and the drive force receiving part and configured to transmit the drive force from the drive mechanism to the drive force receiving part.

* * * * *